United States Patent
Reichow et al.

(10) Patent No.: US 8,711,061 B2
(45) Date of Patent: Apr. 29, 2014

(54) MULTIPLANAR IMAGE DISPLAYS AND MEDIA FORMATTED TO PROVIDE 3D IMAGERY WITHOUT 3D GLASSES

(75) Inventors: Mark A. Reichow, Valencia, CA (US); Daniel M. Joseph, Los Angeles, CA (US); Scott J. Sohan, Newbury Park, CA (US)

(73) Assignee: Disney Enterprises, Inc., Burbank, CA (US)

(*) Notice: Subject to any disclaimer, the term of this patent is extended or adjusted under 35 U.S.C. 154(b) by 135 days.

(21) Appl. No.: 13/468,155

(22) Filed: May 10, 2012

(65) Prior Publication Data

US 2013/0300728 A1  Nov. 14, 2013

(51) Int. Cl.
*G09G 5/00* (2006.01)
(52) U.S. Cl.
USPC ............... 345/6; 345/87; 345/102; 345/204; 359/462; 359/463; 349/15
(58) Field of Classification Search
USPC .............. 345/4, 36, 87, 102, 6, 204; 359/462, 359/463; 349/15
See application file for complete search history.

(56) References Cited

U.S. PATENT DOCUMENTS

| | | | |
|---|---|---|---|
| 7,959,341 B2* | 6/2011 | Erchak et al. | 362/612 |
| 8,154,799 B2* | 4/2012 | Kim et al. | 359/463 |
| 2008/0186575 A1* | 8/2008 | Kim et al. | 359/463 |
| 2012/0243087 A1* | 9/2012 | Lu | 359/478 |
| 2013/0082905 A1* | 4/2013 | Ranieri et al. | 345/32 |

* cited by examiner

*Primary Examiner* — Jennifer Nguyen
(74) *Attorney, Agent, or Firm* — Marsh Fischmann & Breyfogle LLP; Kent A. Lembke

(57) ABSTRACT

An apparatus for providing a dimensional display such as a 3D effect without special-purpose glasses. The apparatus includes a foreground display assembly including a first planar display element with a front surface and an opposite back surface. Additionally, the apparatus includes a background display assembly including: (a) a second planar display element spaced apart from and parallel to the first planar display element; and (b) a light source backlighting a back surface of the second planar display element. The first and second display elements are emissive display units and concurrently display frames of a foreground image stream and corresponding frames of a background image stream. The first display element may be a transparent LCD panel, and the output light from the front surface of the second display element provides backlighting for the first display element such that foreground images are backlit by output light of the second display element.

17 Claims, 8 Drawing Sheets

MULTIPLANAR IMAGE DISPLAYS AND MEDIA FORMATTED TO PROVIDE 3D IMAGERY WITHOUT 3D GLASSES

BACKGROUND

1. Field of the Description

The present description relates, in general, to three dimensional (3D) image generation, 3D media, and 3D display devices and, more particularly, to systems and methods for producing 3D images or depth and space media illusions without requiring viewers to wear 3D glasses or the like, e.g., multiplanar display systems providing a 3D display to viewers rather than projecting stereoscopic images requiring a viewing technology such as particular 3D glasses to be seen by an observer.

2. Relevant Background

There is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and others appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery is one exciting way to appeal to viewers and hold their attention. However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs.

Hence, there remain numerous entertainment and other settings where it is desirable to create unique 3D visual displays to entertain and excite viewers. Further, though, it is desirable to create a display with 3D images without requiring the viewer to wear special headgear or glasses, e.g., without having to employ autostereoscopy or similar techniques. Such a 3D display system and method preferably would be relatively inexpensive to produce and would be useful in the presence of relatively bright ambient light.

SUMMARY

To address these and other needs, a multiplanar display system has been developed that may be operated to provide 3D imagery or 3D displays without the need for observers to wear special glasses or headgear. A first (or foreground) display assembly is provided in the system and includes a first display element that is selectively transparent (i.e., translucent to transparent) to light. The first display element is positioned in the system to provide an outer surface or window to the display system, e.g., proximate to a viewer. The first display assembly is controlled or driven to display foreground images or content with the first display element.

A second (or background) display assembly is provided in the display system, and it includes a second display element that is positioned a distance (e.g., 0 to 36 inches or more) away from a back or inner surface of the first display element. The second display element is controlled or driven to display background images or content. The two display elements provide two spaced apart planes, which are typically parallel to each other, upon which the foreground and background images are displayed. Further, the second display assembly includes a light source or backlight device (e.g., an integral or separate unit) that functions to light the second display element. Significantly, the output of the second display element strikes the back or inner surface of the first display element such that it is backlit by this output. As a result, the foreground images and the background images are concurrently visible on the outer or front surface of the first display element, with the spacing between the two display elements or image planes providing a 3D effect or depth/space to the output of the display system.

The media content provided to the first and second display elements is configured or formatted to enhance the 3D display. For example, the foreground media stream or first display element input may be designed to define or provide transparent areas or portions on the first display element through which background images from the second display element may be projected or displayed. In other words, the background media stream or second display element input was matched to the foreground media stream to map the background images to be displayed to the transparent portions on the first display element.

Further, since the second display element is used to backlight the first display element, the background media stream is matched to (and synchronized with) the foreground media stream so as to provide light to areas or portions of the first display element being used to display foreground images. This may include passing white or colored light through the second display element (i.e., this display element may also be selectively transparent or selectively transmissive to output from the backlight device) in areas or portions mapped to areas or portions of the first display element being controlled or driven to provide the foreground images.

To further add to the complexity of the media streams, the two streams may be configured or designed to allow displayed images or objects to be passed or to move between the two display planes (front surfaces of the first and second display elements), e.g., portions of an object could be displayed on the background display element, then on the foreground display element while other portions remain on the background display element, and then moved back to the background image to cause an object to appear to move toward and away from a viewer of the display system. Again, this is achieved with careful synchronization (or timing control) of the input streams and also mapping of locations of the displayed images/objects on the two display elements.

More particularly, an apparatus is provided for displaying a dimensional display such as a 3D effect without the need for special-purpose 3D glasses. The apparatus includes a foreground display assembly including a first planar display element with a front surface and an opposite back surface. Additionally, the apparatus includes a background display assembly including: (a) a second planar display element spaced apart from and parallel to the first planar display element, with the second planar display element including a front surface facing toward the back surface of the first planar display element; and (b) a light source operating to provide light to a back surface of the second planar display element. In an implementation, the first and second display elements are at least partially transmissive to light and operable, respectively, to concurrently display frames of a foreground image stream and frames of a background image stream provided as input media to the foreground and background display assemblies concurrently with the operating of the light source to provide the light.

Further, the first planar display element may be a transparent light modulator, and the output light from the front surface of the second planar display element provides backlighting for the first planar display element. In such an arrangement, the first planar display element may be provided as a transparent liquid crystal display (LCD) panel, and the frames of the foreground image stream may include foreground images backlit by the output light. In some embodiments, the frames of the background image stream are each paired with particular frames of the foreground image stream.

Then, the frames of the background image stream may include foreground lighting portions mapped in location to the foreground images to provide the output light to display the foreground images via the front surface of the first planar display element. Still further, the frames may include background image display portions at least translucent to the output light and the frames of the background image stream may include background images viewable via the output light passing through background image display portions of the first planar display element. In some cases, the second planar display element is provided as an LCD panel, and the light source is rated to provide at least 600 nits to provide backlighting of the two planar display elements. The front surfaces of the first and second planar display elements may be separated by a distance of at least 12 inches to provide a dimensional effect.

The first and second surfaces are "multiplanar" in the sense that they are positioned in spaced apart planes to achieve a desired parallax, e.g., parallel planes that are 2 to 12 inches or more apart. The content provided by the media input (foreground and background image streams) are viewable concurrently on the first and second display element surfaces by a viewer as the foreground display element is at least partially transparent or transmissive of light from the background display element, and the first and second sets of 2D content combine to create a 3D image or display. In one example, content provided by the media input includes plane or layer-jumping content that is handed off in a synchronized manner by the controller/control system to be displayed sequentially on differing ones of the display elements. For example, a 2D image of a character or a physical object may first be displayed on the foreground display element and move about in this plane, and then second be displayed on the intermediate display element so as to appear further away from the viewer. Such handing-off of media from one display assembly and surface to another significantly heightens the illusion of depth and space of the display, and the size, shape, coloring/brightness, and the like of the additional or plane jumping content may be modified with each jump or move to enhance the realism of an object or character moving further away from or closer toward a viewer.

DETAILED DESCRIPTION OF THE PREFERRED EMBODIMENTS

Figure 1:
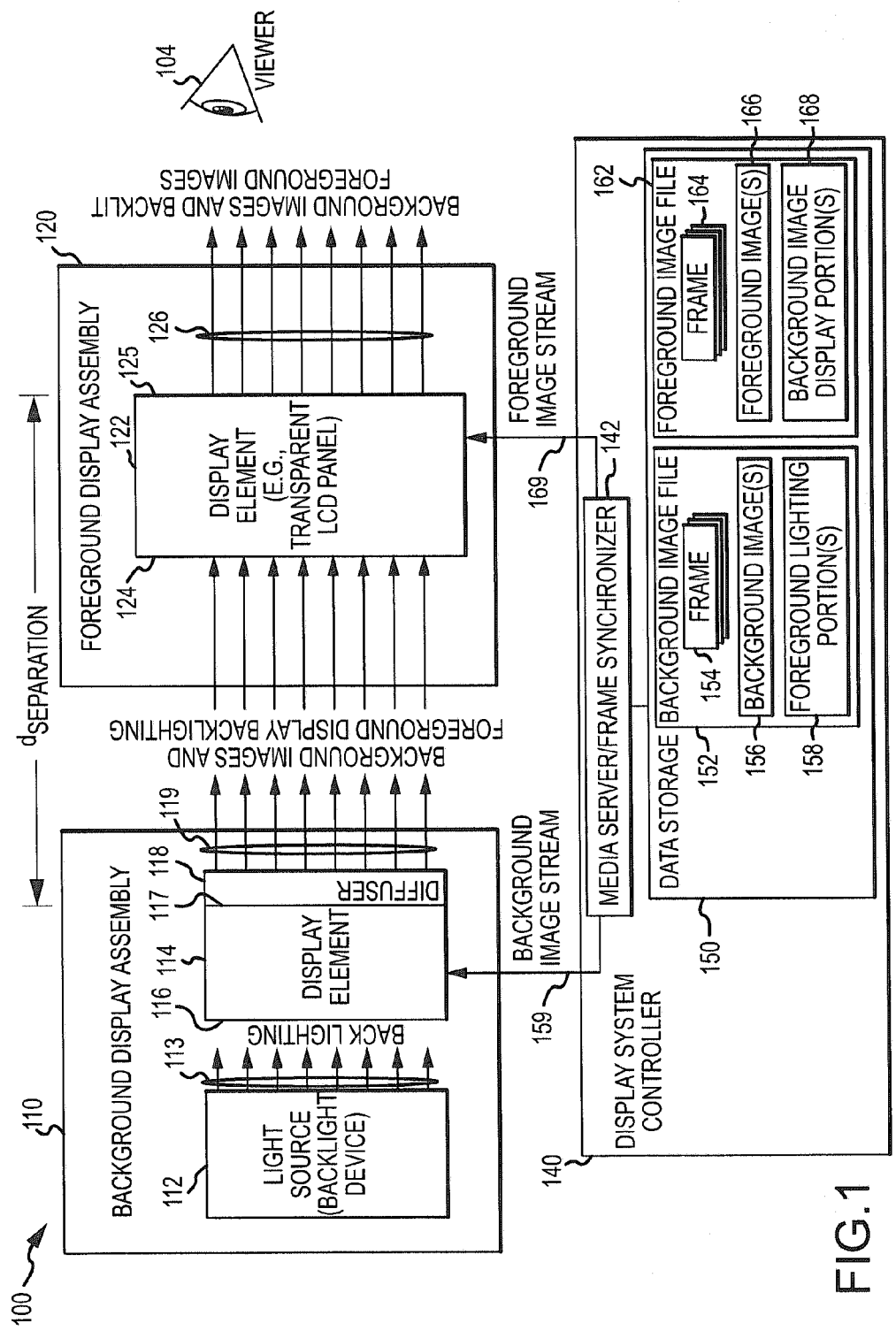
FIG. 1 is a functional block diagram of a multiplanar display system showing use of two display planes to create a 3D display (dimensional output without need for special 3D glasses)

In some embodiments, a multiplanar display system is provided that utilizes a transparent liquid crystal display (LCD) panel ("transparent LCD" or "light modulator") for one or more of the display elements. For example, a display system may include a transparent LCD as the foreground display element while the background display assembly may include an LCD device including a light source or backlight device (e.g., a light source with higher illumination capabilities such as 600 to 900 nits or a higher luminance rating or capacity with one embodiment using a 1500-nit LCD panel in the background display assembly). A media controller is used to feed a foreground image stream to the transparent LCD and to concurrently operate the high-illumination LCD panel to display a background image stream, which acts to backlight the spaced apart and transparent LCD (e.g., with white or colored light) and also to provide spaced apart background objects observable by viewers.

The inventors recognized that transparent LCD panels and similar light modulators could be stacked to provide spatially separated and, typically, parallel display devices to create depth in a displayed or 3D image stream. A backlight is used to illuminate these stacked, transparent LCD panels and may be provided by providing the rear-most LCD panel with a more conventional LCD display that includes a backlight and an integrated LCD layer/element. Prior to the multiplanar display system described by the inventors, manufacturers of transparent LCD panels were struggling to find an application or accepted use of their product. For example, manufacturers were attempting to sell the transparent LCD panels for use on store windows to catch consumers' eyes and on grocery freezer doors. In each of these cases, the LCD panels were illuminated by interior or existing lighting without stacking in the manner described herein.

With the stacking concept in mind, the inventors further understood that conventional media, such as a video, a still image, and the like, is designed for presentation on a single, planar display, such as on a theater screen or a display of a television monitor (e.g., a conventional LCD monitor and other display devices). As a result, creation of a useful multiplanar display involved determining how to generate a 3D image by displaying differing images on two or more parallel, spaced-apart display surfaces and also how to backlight the forward-positioned display elements. In some cases, displayed objects or portions of displayed objects are handed off between the planes or display elements (e.g., pixels are driven from one layer to another in the display system) while, other objects may be displayed in a more either-or manner (e.g., either on the foreground or first display element or on the background or second display element).

It could be said that the media for the multiplanar display system is created or composed specifically with the number and location (spacing or separation distance) of the display elements in mind. There was no need to create or design such media prior to the invention of the multiplanar display system. With this in mind, a portion of the following description provides the methods/algorithms useful in generating the media to drive a multiplanar display system, and such generated media (e.g., digital image streams stored in computer-readable storage devices or media) was not available prior to the inventors' efforts.

In a system with two display elements, this would involve providing a foreground image stream and a background image stream (that provides images and also projects white or other light to backlight the foreground display element). These two image streams may be produced by transforming content useful for display on one plane to display in two planes. In one particular example, a displayed image may be allowed to move from the back of a displayed scene to a more forward or foreground location. To provide this movement, the two image streams are configured such that the image may be initially displayed one hundred percent or wholly by the background or second display element with a transparent portion of the foreground display element allowing it to be viewed.

At a later moment in time or a later set of frames in the image streams (again, the streams are synchronized for concurrently displaying paired/matched frames), the now forward located pixels of the displayed object are dimmed or removed from the background image stream (and second display element) and presented on the physically forward first display, which results in the displayed object visibly popping forward for the viewer. To display the forward-located pixels, white light (or colored light in some cases) is projected through the second or background display element (e.g., the background image stream is adapted to cause the display element to be brightly lit behind the corresponding pixels of the foreground display element) while concurrently driving the first or foreground display element to display the foreground pixels (or portions of the displayed object "located" in the front plane).

Because generation or creation of the input image streams (or multiplanar display system media) is such an important aspect of producing desirable 3D displays (or a multiplane effect), it may be useful to describe further how to process these streams prior to turning to the attached figures and description of an exemplary multiplanar display system. In order to create a dimensional look for the multiplane effect, a media designer should take into account two principles regarding the monitors (display elements) installed and how the display elements or monitors need to work together. By designing media with these principles in mind, one can effectively maximize the multiplane dimensional look.

As a first principle, regardless of how many monitors are used in a multiplanar display system, the foreground monitor(s)/display element(s) are translucent to the background monitor to some degree even when operated to display an image. The level of darkness and lightness in the designed image displayed on the foreground monitor(s) determines the amount of transparency or amount of transmissivity to light. An image on a foreground monitor that is solid black (which represents the darkest image) will provide less transparency than an image that is solid white (which is the brightest image). The same holds true to dark colors and light colors.

As a second guiding principle, the background monitor acts as the "backlight" for the foreground monitor(s). The level of brightness depends on the nit value (the unit of measurement of light emitted per unit area) of the monitor and also of the image displayed (displayed background image provided by the background image stream). For example, darker images allow or provide less light to the foreground monitor(s) while brighter images allow more.

Hence, a background image may include a first portion that is dark to provide little or no backlighting to a corresponding portion of the foreground image (or for display of such first portion images via a transparent portion of the foreground monitor), and the background may further include a second portion that is bright (e.g., white or the like) to more brightly illuminate or backlight a corresponding portion of the foreground image. Such a portion of the background image may be thought of as a backlighting portion (although, in some cases, it may include images of objects that are seen adjacent to the foreground image being backlit or even through a translucent portion of the foreground image). The amount of light transmitted from the background monitor to the front most display (the monitor being the farthest away from the background monitor) also depends on the number of monitor(s) between it and the background source, along with the images on them (e.g., each of these tends to filter at least some of the light output by the backlight source and projected from the front surface of the background monitor or display element).

Understanding these principles is key to designing media for (or image streams for each display element in) the multiplane display system and the 3D dimensional look and spatial effect (e.g., resulting output or display is multidimensional and not flat due to use of spaced apart display planes). The 3D display may be considered to involve "punching in" the multidimensional aspects deeper into the space behind the first display element of the display rather than a conventional 3D system where images protrude outward toward a viewer. This "look" (or 3D display/output) is a combination of images working together to create a multiple focal point composite. When motion is introduced as part of running footage in form of a movie (.mov, .wmv, .avi, .mpg, etc.), the "look" creates a pseudo 3D style display with animated images or objects with motion (e.g., objects or portions of objects moving among the various planes of the multiplanar display system).

It may be useful to provide a couple of working examples of producing media for a multiplanar display system with on two monitors, i.e., a background display element and a foreground display element. It may be desirable to provide an image of a product and also to emphasize/display the sale price of the product. The media may be configured or generated so as to display an image of the product with the sale price on the background display element. The product image may be a colorful cylindrical can against white with black text that says "Special Sale Price Only $200" and such an image may be fed to the background display element via a background image stream (e.g., from a digital video file stored in memory and delivered by a media server/display controller).

Initially, the media may be generated such that a foreground image stream caused the foreground monitor to be solid white, which provides the most transparency, for example, with a transparent LCD panel. In other words, the foreground display element or light modulator is controlled by the foreground image stream to be highly transmissive (or "transparent") to all light projected from the background display element. The price or "Only $2.00" can be emphasized to a viewer by moving the text to the foreground monitor such as by changing frames in both the background image stream and the foreground image stream in a synchronized manner.

Particularly, the background monitor is used to display an image of the product but the image has been modified to only include the text "Special Sale Price" and the foreground monitor is used, via frames of its foreground image stream, to display white with black (or other color) text of "Only $2.00". This foreground image is positioned to be in the same location as it had previously been displayed in the background monitor. This provides a dimensional look to a person's eye as if the text "Only $2.00" just jumped out from the plane of the background display element to the plane of the foreground display element. Further enhancement can be applied by changing the text to a color with bold formatted type (during or after the move between display planes). This swapping of a portion of the display image (or image object) between planes may, in later frames of the media, be reversed with the textual portion of the image being punched into the display space from the foreground display element to the background display element by modifying frames or portions of the two input image streams.

As a second working/practical example, graphics created in 3D software programs or applications (e.g., conventional and available 3D video graphics tools) allow a media designer to move objects back and forth from background to foreground and back again, by applying the object's Z-depth information. Z-depth is a grayscale image that is a graphical representation of depth in 3D space. Every pixel in the image is assigned a 0-255 grayscale value based upon its distance from the camera. Objects closest to the camera are white and the objects furthest from the camera are black with a gradient in between.

For example, one could take a 3D object of a car (an existing 3D image file stored in memory/data storage) and rotate it, using a computer (and its processor) running a 3D graphics application, on a turntable and apply its Z-depth map as a matte that is composited to generate a background image stream. This image stream can then be provided by a multiplanar display system controller or media server as input to the background display assembly for displayed on the background monitor (or second or background display element).

Then, the media designer could take the same image with a composite of the Z-depth map inverted and display that on the foreground monitor. As the object rotates in the paired and synchronized frames of the foreground and background image streams (the created media input to the multiplanar display system), the area or portion of the car (image/object) that is closest (in the 3D space of the display system) will appear to a viewer of the front surface of the foreground display element to move from the background to the foreground planes and then to return to the background plane while rotation continues.

This technique of inverting the Z-depth map to produce the foreground image is one technique of providing a handoff or swapping of a rotating image between the background and foreground display elements, but other processes may be used to achieve such an effect. For example, an image or object that is not rotated but that is moving gradually from plane to plane could be "swapped" as may be the case in the above example where subsets of the pixels of the text "Only $2.00" could be moved in one or more sequential frames of the image streams until all (or a defined portion) of the object is moved to the new display plane.

The media generation may also include other processing to achieve desired visual effects. For example, the media generation process may include applying a blur as well as increasing the brightness to the background image area that is also being displayed in the foreground monitor (i.e., background images allowed (by configuration of the foreground image stream) to be transmitted through the foreground display element or "displayed background images"). Such media processing to provide a background image stream causes the detailed foreground image to become a focal point for the multiplanar display system, and a viewer's eye(s) perceives a dimensional pseudo 3D style effect. The media designer can also create a pseudo Z-depth map for graphics that were made in 2D applications that achieves the same or a similar look or display output as well.

With the above discussion of the inventive concepts in mind, it may now be useful to describe a multiplanar display system 100 as shown in FIG. 1. The system 100 includes a background display assembly 110 and a foreground display assembly 120 to concurrently display background and foreground images on planes spaced apart by a distance, $d_{Separation}$ (e.g., 0 to 36 inches or more). In other embodiments, one or more additional display assemblies similar to the foreground display assembly 120 are included in the system 100 to display images on planes between the planes provided by front/display surfaces 117, 125 of display elements 114, 122. A two-plane system 100 is described for simplicity sake but not as a limitation.

The background display assembly 110 includes a display element 114 with a back surface 116 and a front surface 117. The display element 114 may take the form of an LCD panel or other emissive display device. A diffuser 118 (e.g., a ⅛-inch sheet of acrylic or the like with a matte finish or other diffuser device) may be provided as shown to treat the output from the display element to limit light artifacts (e.g., the Moire effect) or to otherwise create a desired projection of a background image and/or backlight of the foreground display element 122. The output 119 of the display element 114 is light that provides both the background images and also backlighting to cause the foreground images provided by the foreground display element 122 to be displayed as shown at 126 to viewer 104.

In this regard, the background display assembly 110 further includes a light source 112 that is powered to output light or backlighting 113 onto the back surface of the planar display element 114. In this way, the display element 114 is backlit to produce its output light 119 onto a back surface 124 of the foreground display element 122. The light source 112 may take the form of a backlight device provided as part of an LCD monitor. In one embodiment, for example, the light source 113 and display element 114 are provided as an LCD unit, and, more preferably, the light source 112 is able to provide 600 to 900 nits or more with a 1500 nit LCD unit used to provide the light source 112 and display element 114 in one implementation of the system 100. Brighter illumination with light source 112 supports the use of two or more display elements 114, 122 while still achieving a relatively bright and clear display or output 126 for viewing by viewer 104.

The display element 114, such as an LCD panel, is driven, or operated based on input in the form of a background image stream 159 provided by a display system controller 140. The controller 140 may include a media server or driver to provide the stream 159 to the display element 114, and this causes selective pixels of the display element 114 to transmit or block backlighting 113 to produce the output light 119 (background images and backlighting for foreground images). To this end, data storage 150 is provided in (or accessed over a network connection by) the controller 140, and the media server 142 acts to retrieve a stored background image file 152 used to provide image stream 159.

The media server 142 acts to synchronize the frames 154 of the background images with frames 164 of the served foreground image file 162 in foreground image stream 169. In this way, paired ones of the frames 154, 164 (input media for driving/operating the display system) are displayed concurrently (or nearly so) by the two display elements 114, 122. The background frames 154 may include one or more background images 156 that are to be included in the output 119 of display element 114 and be displayed to viewer 104 in output light 126 via corresponding background image display portions 168 of frames 124 in the foreground image files 162. Further, the background frames 154 may include foreground lighting portions 158 that are configured particularly to provide backlighting in output 119 for corresponding foreground images 166.

In other words, the frames 154, 164 are time synchronized such that matched pairs of the frames 154, 164 are displayed via display elements 114, 122 concurrently. Further, background images 156 are mapped location-wise on the display element 114 to background image display portions 168 such that the display element 122 is transparent or relatively transmissive to light 119 at corresponding portions of the foreground display element 122. Likewise, the foreground lighting portions 158 are mapped by location (pixel sets of display elements 114, 122) such that areas of the back surface 124 receiving backlighting 119 from the foreground lighting portions 158 (areas of white pixels of display element 114 or the like) correspond with where the foreground images 166 are generated. This concurrent display of paired frames 154, 164 along with mapping of the imagery creates an output 126 that provides a dimensional (3D) effect with background images appearing to be on the plane of the front surface 117 of the display element 114 and with foreground images (backlit by portions of light 119) appearing to be on the plane of the front surface 125 of display element 122 (two sets of images spaced apart by a distance, $d_{Separation}$).

As shown, the system 100 includes a foreground display assembly 120 with a display element 122. As discussed above, the display element 122 may be a transparent LCD panel or similar light modulator that is adapted to selectively be transparent to a large portion of the light 119 projected from the display element 114 of the background display assembly 110. Particularly, the foreground image stream 169 is used by the controller 140 to drive the display element 122 to display foreground images 166 that are backlit with foreground lighting portions 158 of projected light 119 and also to "display" or provide background image display portions 168 through which the background images 156 may be transmitted through the display element 122 (e.g., through translucent to nearly transparent portions of the display element 122). The result is the light 126 with background and foreground images being observable by viewer 104.

The display element 122 is typically a planar panel with a back surface 124 facing the front or projection surface 117 of the background display element 114 to receive projected light 119. The display element 122 further includes a front surface 125 through which output light 126 is emitted to the viewer 104. The two display elements 114, 122 are typically arranged to be spaced apart the separation distance, $d_{Separation}$, with front surfaces 117, 125 parallel to each other. Further, the size and shape of the panels/elements 117, 122 may be chosen to be matching to facilitate accurate location mapping of corresponding portions of the displayed background and foreground frames 154, 164 (e.g., background images 156 aligned with background image display (or high light transmissiveness) portions 168 and so on).

Figure 2:
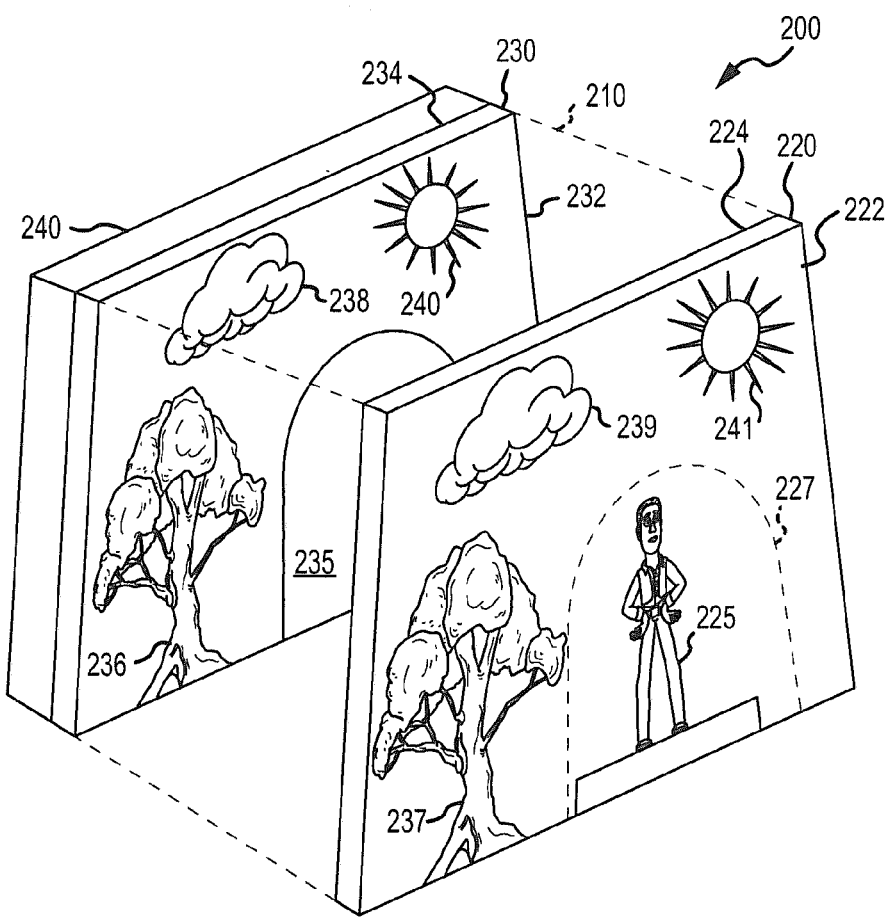
FIG. 2 is a multiplanar display system with a housing shown with dashed lines to expose a second or background display element, with both a foreground and the background display elements operating (e.g., per driving or input media)

FIG. 2 illustrates in a simplified manner a physical implementation of a multiplanar display system 200 (such as may be used to implement functionality of system 100 of FIG. 1). A housing or container 210 is shown with dashed lines and may take the form of solid or opaque walls that enclose the other components of the system 200 and define and maintain separation spacing between display planes for displayed foreground and background images. The housing 210 also acts to hide the presence of the separate, second display element 230 to further the illusion or visually dimensional effect of system 200.

In the housing 210, a first display element 220 is supported with a front or outer surface 222 and a back or inner surface 224. The multiplanar display system 200 is adapted to play or take as input media defining a foreground image stream and a background image stream. The foreground image stream is used to set the pixels of the first display element 220, e.g., a transparent LCD panel or the like. As shown, the foreground image stream operates the display element 220 to display a foreground image 225 while also providing transparent (or light transmissive) portions shown relatively crudely or roughly as being outside of dashed line 227. This is "rough" because the element 220 typically is selected to allow each pixel of the display to be addressed and operated selectively to control the amount of transparency. Hence, the transparent portion of element 220 may be all the pixels except those defining foreground image 225 (or simply the sets of pixels mapped to background images 236, 238, 240).

The display system 200 also includes a second or background display element 230 with a front surface 232 and a back surface 234. The system 240 also includes a light source 240 for illuminating the back surface 234. For example, the combination of display element 230 and light source 240 may be a conventional LCD such as a 1500 nit LCD or other higher illumination LCD monitor/device. The front surfaces 222, 232 may be planar and parallel to each other with their spacing providing a dimensional appearance to the output displayed via front surface 222.

The system 200 is shown during use/operation with the backlight source 240 providing light to surface 234 and with second display element 230 being driven by a background image stream from a media source/server (not shown). The background image stream includes an area 235 that is mapped to the location of the foreground image 225, and the area 235 is an area of high transmissivity of light from source 240. For example, the pixels of element 230 in area 235 may be a very bright color or even white such that the corresponding foreground image 225 is backlit by the light projected from front surface 232 of second display element 230, e.g., the image 225 is displayed on the plane of the front surface 222. An image or object may be part of area 235 to create a desired effect/illusion or it may a solid color.

The background image stream also causes the element 230 to display a number of background images 236, 238, 240 when backlit by light source 240 via back surface 234. As discussed above, areas outside of dashed line 227 of the first display device are caused to be transmissive to light by a foreground image stream (e.g., to be substantially transparent apart from the pixels associated with foreground image(s) 225). As a result, the light projected from the front surface 232 strikes the back surface 224 of first display element 220 and a large portion is transmitted through the panel/element 220 so that the background images 236, 238, 240 are visible via front surface 222 as shown at 237, 239, 241. In other words, the foreground image 225 appears in a first/foreground plane (plane of surface 222) concurrently with background images 237, 239, 241, which appear to be positioned a distance behind the foreground plane in a second/background plane (plane of surface 232).

Figure 3:
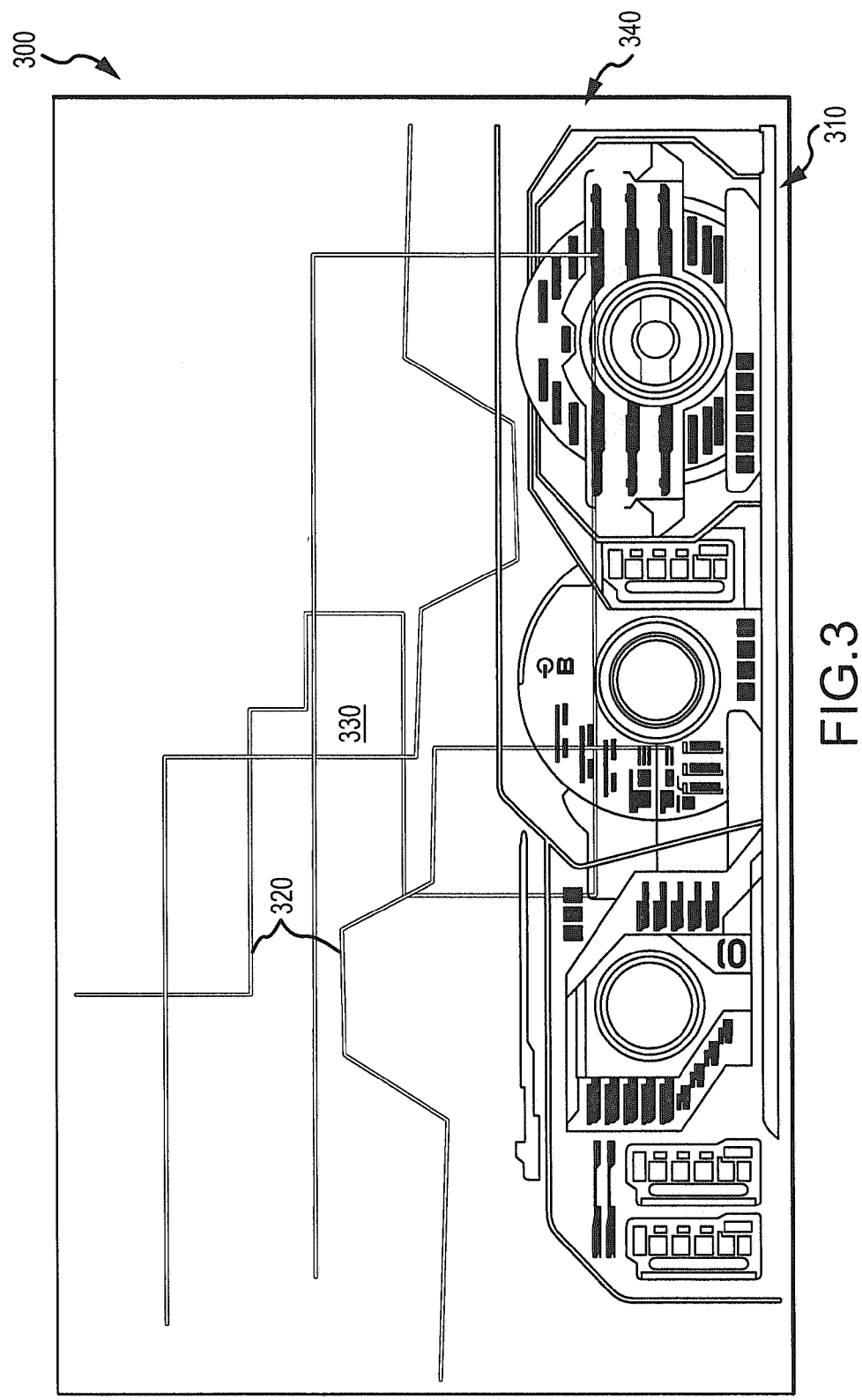
FIGS. 3-5 illustrate a frame of a foreground image stream, a corresponding or paired frame of a background image stream, and a resulting or composite 3D display/output when these two image streams are provided to a multiplanar display system such as the two-plane device shown in FIG. 2.
Figure 4:
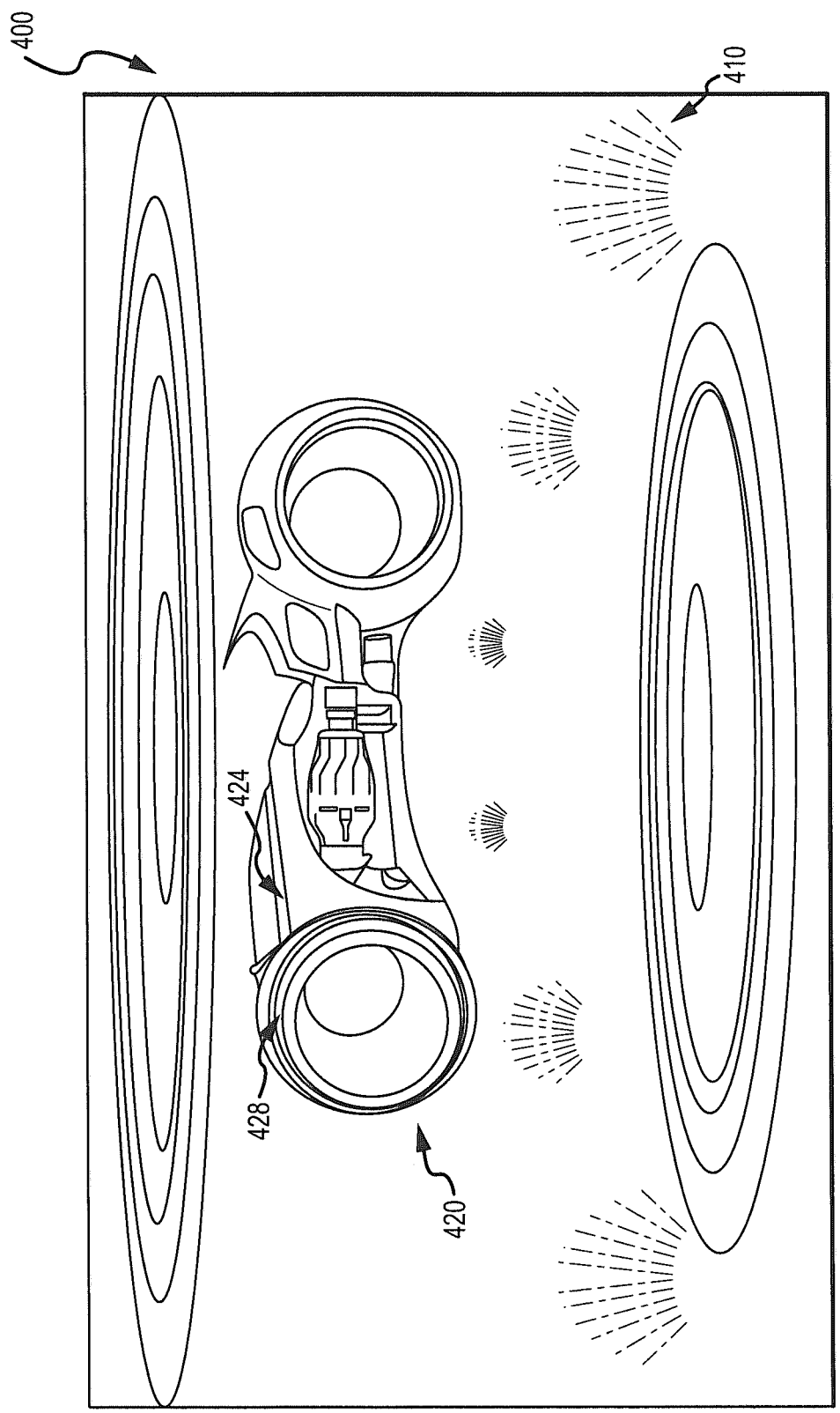
Figure 5:
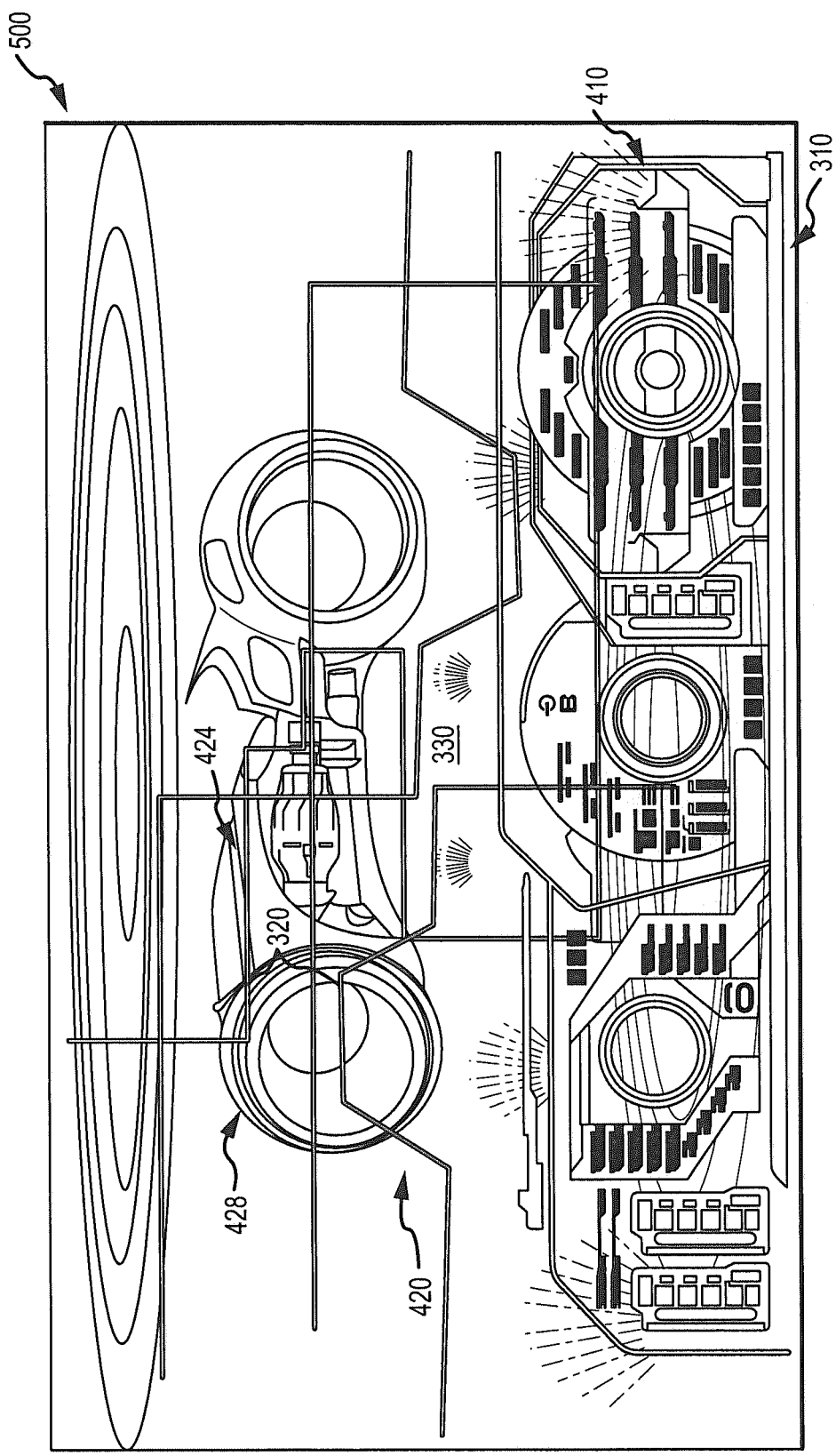

FIGS. 3-5 illustrate a more complex example of how a two-plane display system (such as system 200 of FIG. 2) may be used to create a 3D display or dimensional effect. FIG. 3 shows a frame 300 of a foreground image stream such as it may be viewed on a media designer workstation or the like. This image stream in use would be provided to the first or foreground display element (e.g., a transparent LCD panel). As shown, the frame 300 includes foreground images intended for display including a control panel object 310, along with a pattern of bright line patterns (or line pattern object) 320, and a centrally positioned light field or burst object 330. The frame 300 further includes other areas 340 that are generally adapted to cause the display element showing the frame 300 to be transparent or at least transmissive to received light.

FIG. 4 shows a frame 400 of a background image stream such as it may be viewed on a media designer workstation or otherwise in isolation. This image stream is paired or matched with the frame 300 of FIG. 3 and is used concurrent with use of frame 300 so as to drive or operate a second or background display element (e.g., an LCD panel with a built in backlight or separate lighting source). As shown, the frame 400 includes background images including shooting flames 410 and a motorcycle/vehicle 420 with a dark body 424 and bright wheels 428.

FIG. 5 illustrates an output 500 of a multiplanar display system resulting from the concurrent operation of a foreground display element and a background display element to display frames 300 and 400. In the 3D output 500, the control panel image/object 310 is not substantially translucent and the light output via frame 400 and the background display element causes it to be displayed nearly "as is" or as shown in FIG. 3. The background image 410 is partially hidden or blocked by this foreground image 310, with the images 410 appearing behind and spaced apart from image/object 310. In contrast, the white foreground images 320, 330 are more translucent or light transmissive such that the body and wheels 424, 428 of vehicle 420 being at least partially visible through images 320, 330 with the amount of such visibility or clearness depending at least in part on the brightness of the background image, with brighter wheel objects/images 428 being more visible than darker body objects/images 424. From system output 500, it can be seen that effect achieved with a pair of image streams (media input for a display system) requires a careful marrying of the foreground and background images to properly backlight foreground images, to provide areas in the foreground images where background images can be seen, and other factors (discussed in more detail above).

Figure 6:
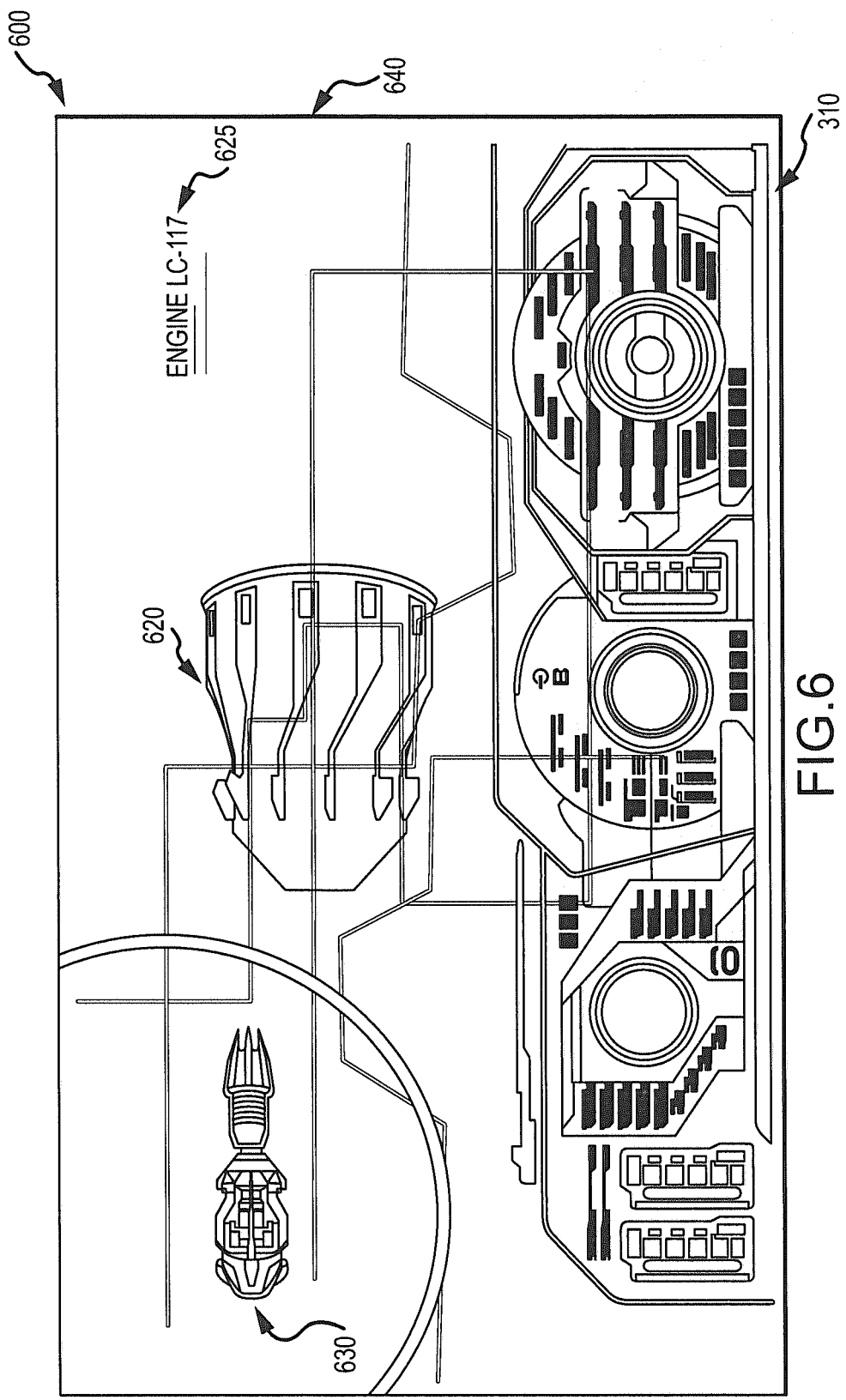
FIGS. 6-8 illustrate, similar to FIGS. 3-5, a foreground image stream, a corresponding or paired frame of a background image stream, and a resulting or composite 3D display/output when these two image streams are provided to a multiplanar display system such as the two-plane device shown in FIG. 2.
Figure 7:
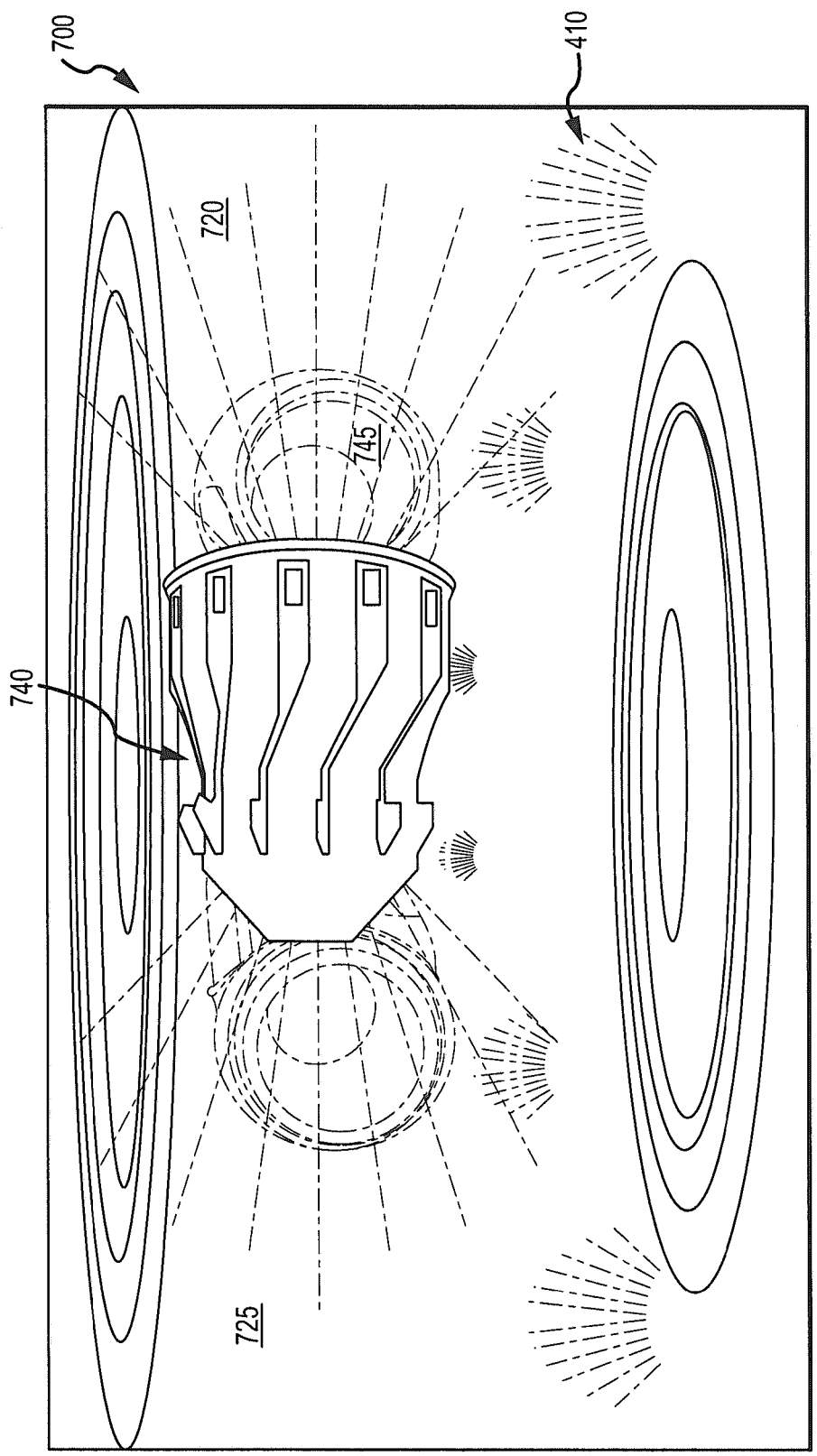
Figure 8:
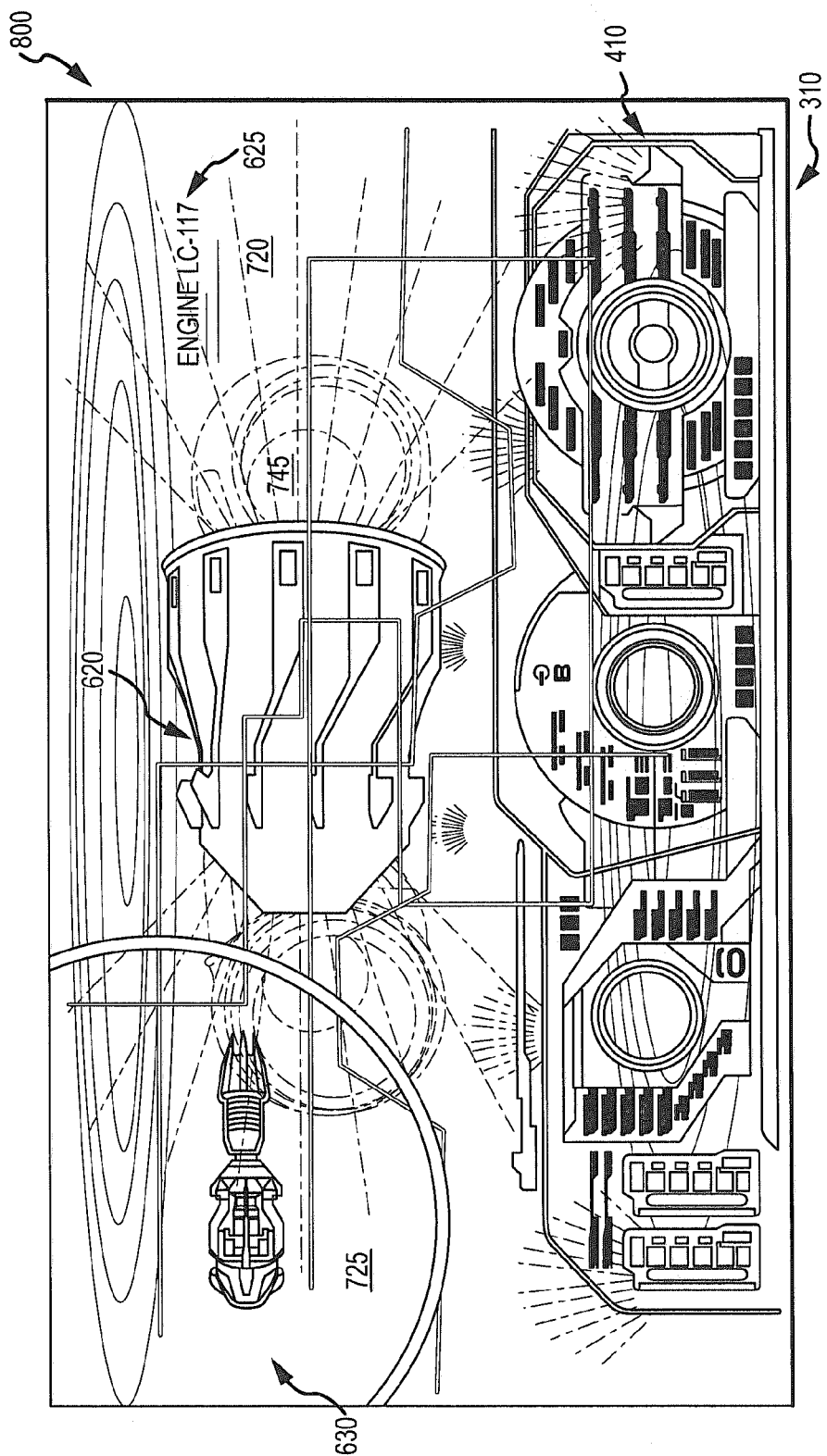

FIGS. 6-8 illustrate, similar to FIGS. 3-5, a frame 600 of a foreground image stream, a corresponding or paired frame 700 of a background image stream, and a resulting or composite 3D display/output (3D frame) 800 when these two image streams are provided to a multiplanar display system such as the two-plane device shown in FIG. 2. The foreground frame (of input media for a multiplanar display system) 600 may include image objects from other foreground frames such as the control panel 310, and, as with foreground frame 300, the frame 600 may include areas or portions 640 adapted to be transmissive to light (e.g., to display background images to a viewer concurrently with foreground images such as image 310). Additionally, frame 600 is shown to include textual or label objects 625 associated with an image object 620 (engine/motor in this case for the vehicle of FIGS. 3-5). The foreground image 620 is provided in the media/frame 600 to be a combination of dark and brighter areas such that it is less and more transmissive of light. Another image object 630 is also provided, which may be a single color/transmissiveness.

FIG. 7 illustrates a frame 700 of a background image stream (or input media) that is paired/matched with frame 600, i.e., their display would be synched or concurrent on background and foreground display elements. The frame 700 is generated to suit the design/content of frame 600. Particularly, the frame 700 (as with frame 400) includes bright flame/lighting images 410 that are mapped to be located on a display element matching portions of the areas 640, which were the transmissive areas of frame 600, such that the images 410 will be viewable in a composite of the two frames or a 3D output of a multiplanar display system displaying the two frames 600 and 700.

Further, the background frame 700 is generated/designed so as to provide desired backlighting of certain foreground images. Particularly, foreground display portions or areas 720, 725 are provided that are bright (e.g., white or the like) and mapped in location to be "behind" the text/label object 625 and the more translucent image object 630. These backlighting portions 720, 725 are larger and different in shape such that a portion of the light generated through these images will be visible concurrently with the backlit images 625, 630 (about the outside to achieve a desired effect). Similarly, image object 745 is mapped to be adjacent to the location of foreground image 620 (in an area in foreground frame that is transmissive to transparent) such that it will be displayed as part of the 3D output of the display system.

In contrast, though, a backlighting image object 740 is included in frame 700 that is mapped in size and shape to foreground image 620 such that light from a backlight source passing through a display showing image 740 will only (or mostly) strike the display showing image 740 to display image 740 in a final composite (or 3D output of a display system). To this end, the backlighting image 740 may be very bright to allow significant fractions of the backlighting to pass through the display element to be projected onto display at the location of foreground image 620, which is shown to include both dark portions and bright/more translucent portions.

FIG. 8 illustrates a frame 800 of a 3D output or display provided by a multiplanar display system using a background display element to display frame 700 (with a light source backlighting the background display element) and a foreground display element to display frame 600. The light projected from the background display element based on frame 700 provides the backlighting of the foreground display element. As shown, the images and backlighting (or output) of the background display element causes the frame/display 800 to be visible/observable to a viewer. The output frame 800 includes the control panel image 310 (foreground image), the flame/lighting image 410 (background image a distance behind the control panel 310), and the textual and translucent images 625, 630 with at least portions of the light associated with background images 720, 725 (which are backlighting and also background images as they provide both functions). Likewise, the background image 745 is viewable in the 3D output frame 800.

However, for the most part (or wholly) the background image 740 acts as a foreground image display area/portion of frame 700 such that a viewer mainly or wholly sees the foreground image 620 of frame 600 due to lighting associated with background/backlighting image 740 in frame 800. The darker portions of the image 620 may be mapped to brighter portions of the image 740 than brighter portions so as to have the entirety of image 620 appear clearly or with the same intensity to a viewer (unless other effects are desired). The composite frame 800 when considered with input media frames 600 and 700 allows one to more readily understand the need for coordinating the design/generation of foreground and background image streams (and other streams when more display elements are used) to achieve a desired 3D display.

In practice, unique effects can be achieved by moving all or portions of objects from one plane to another. For example, the vehicle 420 of FIGS. 3-5 could be rotated about an axis such that portions of it move from the front to the back display planes. This is achieved by sequentially changing the images and backlighting provided by the background images over a number of frames of the input media (foreground and background image streams).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the illustrated and many of the examples discussed use of two display elements (a foreground display element and a background display elements), but the invention is directed toward a "multi" layer or plane display. The principles and concepts described are readily applicable to use of two, three, or more foreground display elements, and each would be controllable to be selectively transparent to light "projected" or provided by the backlight device or from the display surface of the background display element. One embodiment, for example, may include three display elements with a middle display element positioned between the foreground and background display devices shown in the figures, and the image stream provided to this display panel would be matched to the concurrently provided background and foreground image streams in the manner described above.

Further, though, a static or steady state backlight source was described (e.g., a source providing 600 to 1500 nits or more), the display systems may utilize a dynamic backlight. For example, OLEDs or the like may be used to provide a dynamic backlight in which portions of the light source may be turned on and off in a rapid and controlled manner time synchronized to images of frames in media input to the multiplanar display elements). For example, this would allow the light source to selectively provide light to differing portions of the background display element (and, therefore, other more forwardly located display elements).

Although not shown, the first or foreground display element may be positioned adjacent to or proximate to a frame display assembly. The frame display assembly may include one or more frame display elements that are operable in a synchronized manner with the foreground and background (or more) display elements to enhance the overall display. For example, one embodiment may include a frame display element about the periphery of the foreground or first display element. This frame display element may be formed of a material that is transmissive to light such as a plastic, a glass, or a ceramic. A pattern (e.g., a color image or graphic) may be provided in the body of the frame display element. A light source may be provided about the frame display element that can be selectively operated to provide light to portions of the frame display element. In one embodiment, the body is provided as two or more layers of glass/plastic/ceramic with differing graphics or patterns that can be displayed when lit by the tight source.

The light source may include numerous lights such as rows of RGB LEDs or the like to provide edge or other lighting of the graphics/patterns or the like of the frame display element, and a controller may be used to selectively illuminate all or portions of the patterns/graphics with various colors to achieve a desired display. Again, operation of these light sources and the graphics/patterns chosen for the frame display element can be based on the media provided to the planar display elements. Further, each of the lights/sources such as LEDs may be individually (or as subsets) addressable and selectively controlled by a programmable controller to provide such synchronization with the media server/controller for the planar display elements.

In some embodiments, more than one transparent LCD layer may be used to implement the ideas described herein. Such embodiments may use a brighter back LCD or light source (e.g., 2000 to 2500 nit or more). These embodiments may be useful in providing multiple layers or display surfaces in the dimensional display assemblies or systems.

In many preferred embodiments, the transparent and non-transparent monitors are both circularly polarized (rather than using monitors which are linearly polarized). In some embodiments (not shown), a "real" physical set can be provided behind the transparent LCD. This set can also look out into the outdoors such that the Sun (or other lighting) acts as the backlight. In this way, the display system may appear to be a digital stained glass window where the window is replaced with a transparent LCD which looks outside. With regard to media production, white media generally equates to a transparent or clear display and anything else, all the way down to black, is a gradation thereof. Further, the front layer (or the transparent LCD) could have a fabric scrim, veneer, or texture adhered to it to provide more illusion and disguising.

We claim:

1. An apparatus for providing a dimensional display, comprising:
    a foreground display assembly including a first planar display element with a front surface and an opposite back surface; and
    a background display assembly including:
        a second planar display element spaced apart from and parallel to the first planar display element, the second planar display element including a front surface facing toward the back surface of the first planar display element, and
        a light source operating to provide light to a back surface of the second planar display element,
    wherein the first and second planar display elements are at least partially transmissive to light and operable, respectively, to concurrently display frames of a foreground image stream and frames of a background image stream provided as input media to the foreground and background display assemblies concurrently with the operating of the light source to provide the light,
    wherein output light from the front surface of the second planar display element, including one or more background images in the frames of the background image stream, provides backlighting for the first planar display element, and
    wherein the frames of the foreground image stream include foreground images backlit by the output light.

2. The apparatus of claim 1, wherein the first planar display element is a transparent light modulator.

3. The apparatus of claim 2, wherein the first planar display element comprises a transparent liquid crystal display (LCD) panel.

4. The apparatus of claim 1, wherein the frames of the background image stream are each paired with particular frames of the frames of the foreground image stream and wherein the frames of the background image stream include foreground lighting portions mapped to the foreground images to provide the output light to display the foreground images via the front surface of the first planar display element.

5. The apparatus of claim 1, wherein the frames include background image display portions at least translucent to the output light and the frames of the background image stream include background images viewable via the output light passing through background image display portions of the first planar display element.

6. The apparatus of claim 1, wherein the second planar display element comprises an LCD panel and the light source is rated to provide at least 600 nits.

7. The apparatus of claim 1, wherein the front surfaces of the first and second planar display elements are separated by a distance that creates a predefined parallax.

8. A multiplanar display system, comprising:
    a foreground display assembly comprising a transparent LCD panel;
    a background display assembly comprising an emissive display element with a lighting source backlighting the emissive display element, wherein planar front surfaces of the transparent LCD panel and the emissive display element are substantially parallel and spaced apart a separation distance; and
    a controller concurrently providing a foreground image stream to the transparent LCD panel and a background image stream to the emissive display element,
    wherein frames in the foreground and background image streams are displayed in a time-synchronized manner,
    wherein light passing through the emissive display element from the lighting source backlights the transparent LCD panel,
    wherein the frames in the foreground image stream include foreground images mapped to first areas of the transparent LCD panel that are illuminated by the light passing through the emissive display element, and
    wherein the frames in the foreground image stream include display portions mapped to second areas of the transparent LCD panel that are more transmissive to light than the first areas.

9. The system of claim 8, wherein the frames in the background image stream include background images in mapped for display via the second areas of the transparent LCD and further includes foreground image lighting portions mapped to the first areas of the transparent LCD to illuminate the foreground images concurrently with the display of the background images via the second areas of the transparent LCD.

10. The system of claim 8, wherein the frames of the foreground and background image streams include an image object that is first displayed on the emissive display element and is second displayed on the LCD panel.

11. The system of claim 8, wherein the background display assembly comprises a 1500 or higher nit LCD panel.

12. The system of claim 8, further including a frame display element extending adjacent to the transparent LCD panel and being selectively operable to concurrently display content with operation of the transparent LCD panel to display the frames of the foreground image stream.

13. An input media for a multiplanar display system, comprising:
- a foreground image file defining a first set of image frames for display on a first display element, each of the image frames of the first set including a foreground image for display in a first area of the first display element and a display portion defining a second area of the first display element, wherein the foreground image blocks light incident on the first display element and wherein the display portion is substantially transparent to the light incident on the first display element; and
- a background image file defining a second set of image frames for display on a second display element spaced apart from the first display element and arranged to provide output light onto the first display element, wherein each of the image frames of the second set includes a background image mapped by location to the second area to be displayed through the first display element and a foreground lighting portion mapped by location to the first area and causing the second display element to provide white light or colored light in the output light to backlight the foreground image.

14. The input media of claim 13, wherein the first display element comprises a transparent LCD panel.

15. The input media of claim 13, wherein a subset of the image frames of the first and second set of image frames include an image object defining a first portion displayed on the first display element and a second portion concurrently displayed on the second display element.

16. The input media of claim 13, wherein the foreground lighting portion causes the second display element to provide white light in the output light.

17. The input media of claim 13, wherein at least a number of the frames of the background image stream comprises a 3D object generated by applying a Z-depth map as a matte and compositing and wherein a corresponding set of the frames of the foreground image stream comprises the 3D object with composite of the Z-depth map inverted.

* * * * *